Figure 1:
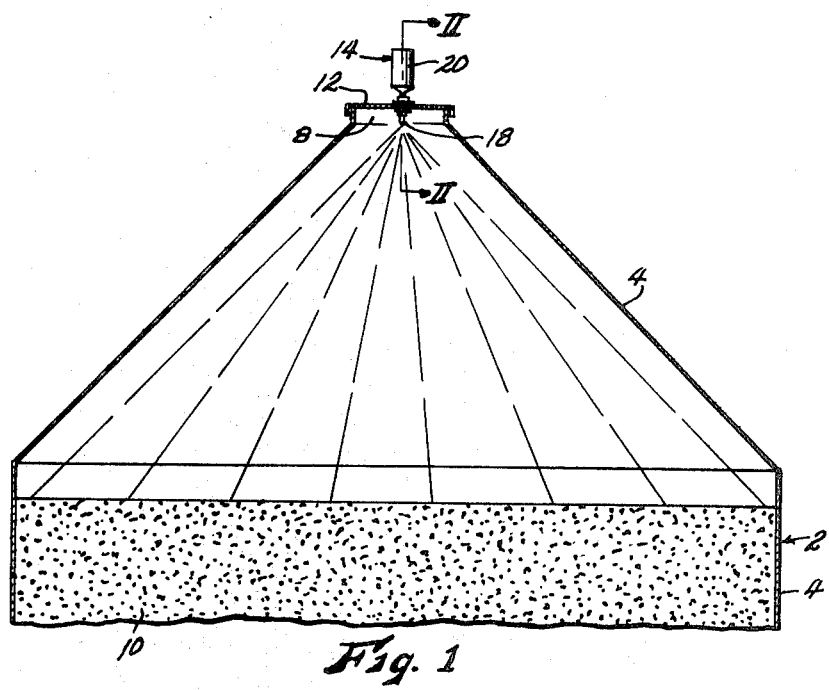

United States Patent

[11] 3,625,433

[72] Inventors Vaughn I. Moss
 1005 Nebraska;
 Garth A. Sharp, 1301 Nebraska, both of
 Mound City, Mo. 64470
[21] Appl. No. 874,333
[22] Filed Nov. 5, 1969
[45] Patented Sept. 20, 1971

[54] INSECTICIDE APPLICATOR FOR GRAIN BINS
 2 Claims, 2 Drawing Figs.
[52] U.S. Cl. ..................................... 239/271,
 220/87, 239/276, 239/282, 239/309
[51] Int. Cl. ....................................... A62c 31/22
[50] Field of Search.......................... 239/271,
 272, 282, 309, 600, 209, 276, 208; 43/129;
 222/541; 134/62, 198; 118/200; 401/132; 99/235
 S; 220/87

[56] References Cited
UNITED STATES PATENTS
| | | | |
|---|---|---|---|
| 2,015,824 | 10/1935 | Trompeter ................... | 220/87 |
| 2,224,010 | 12/1940 | Barber......................... | 239/271 |
| 2,391,582 | 12/1945 | Martin.......................... | 239/309 X |
| 2,540,447 | 2/1951 | Henrikson.................... | 220/87 |
| 2,813,753 | 11/1957 | Roberts........................ | 239/271 |
| 2,862,765 | 12/1958 | Wing............................. | 239/209 X |

Primary Examiner—Lloyd L. King
Attorney—John A. Hamilton

ABSTRACT: An insecticide applicator for grain bins consisting of a pipe nipple fixed in a portion of said bin to establish communication between the interior and exterior thereof, a nozzle affixed to the inner end of said nipple and positioned centrally over the grain surface of said bin, and a pressurized insecticide container adapted to be interconnected with the external end of said nipple, said nozzle being adapted to apply said insecticide uniformly over the grain surface in said bin.

PATENTED DEC 7 1971 3,625,433

INVENTORS.
Vaughn I. Moss
Garth A. Sharp
BY
John A. Hamilton
Attorney.

INSECTICIDE APPLICATOR FOR GRAIN BINS

This invention relates to new and useful improvements in insecticide applicators, and has particular reference to an insecticide applicator especially adapted to treat the contents of a grain bin such as is commonly used for the storage of grain.

While it is of course well-known that bin-stored grain should be treated periodically with insecticides to prevent insect damage and preserve the grain, there are also well-recognized problems in connection with such treatment. For example, many insecticides are applied in the form of a liquid spray to the top surface of the grain in the bin, and to assure a uniform coverage of the grain area it is usually necessary that a workman actually enter the bin and walk around on the grain surface. Not only is this a time-consuming and hence costly process, but some insecticides, or the fumes thereof, are harmful to human beings, so that the process can also be dangerous. Also, while many insects do not normally penetrate more than a few inches below the grain surface, and while the nature or quantity of spray applied can be adjusted to penetrate into the grain to this depth, it is also known that the mere uncovering of the bin to admit a workman, and the concurrent admission of light, causes the insects to burrow deeper into the grain to escape the light, thus requiring insecticides which penetrate deeper, or more insecticide. Some insects, notably weevils, congregate in the bottom of a bin, particularly in zones thereof having large concentrations of dirt, chaff, and the like. Such insects are usually combated by a heavier-than-air gas, released at the top of the grain bed and settling therethrough by gravity. Such gases are extremely dangerous to humans, and are commonly applied in pellet form, the pellets being pushed into the grain bed by a workman at the surface, and operable to release the gas only slowly, or after a predetermined time delay, to give the workman time to leave the bin. Safety regulations require two men to administer this treatment, so that one could assist the other in the event either should be overcome by the gas.

Accordingly, the object of the present invention is the provision of an insecticide applicator for grain bins which solves all of the above-enumerated problems, in that it provides automatically for uniform coverage of a grain bed by an insecticide spray, is equally effective for use with either liquid sprays or gases, does not require the entry of a workman into the bin at any time, does not require the uncovering of or admission of light to the bin, and provides for the application of a predetermined quantity of insecticide which has been calculated to be necessary for proper treatment under any given set of conditions. The latter provision is extremely valuable in insuring adequate treatment while at the same time avoiding overapplication and hence wastage of the insecticide.

Other objects are simplicity and economy of construction, efficiency, dependability, and convenience of operation, and adaptability for use in bins of various shapes and types.

Figure 2:
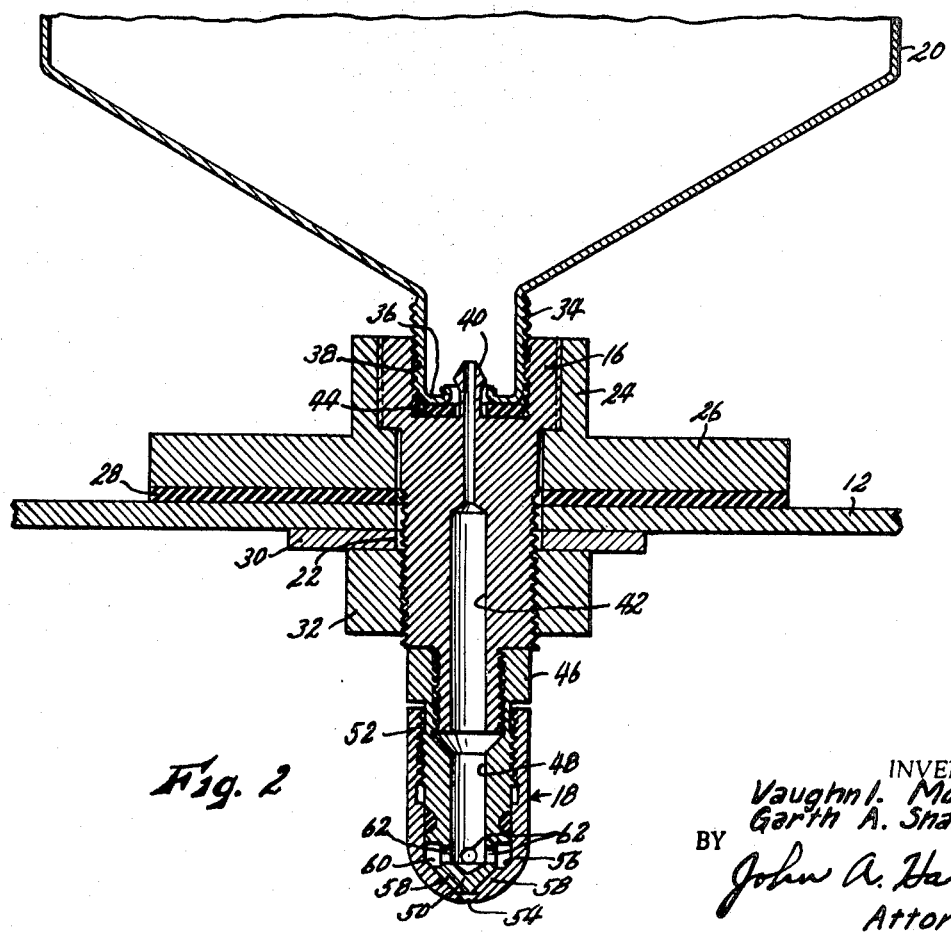

With these objects in view, as well as other objects which will appear in the course of the specification, reference will be had to the accompanying drawing, wherein:

FIG. 1 is a vertical-sectional view of the upper portion of a grain bin having an insecticide applicator embodying the present invention operatively associated therewith, and FIG. 2 is an enlarged, fragmentary sectional view taken on line II—II of FIG. 1.

Like reference numerals apply to similar parts throughout the drawing, and the numeral 2 applies generally to a grain bin, shown fragmentarily, having a cylindrical sidewall 4 and a top wall 6 of frustoconical form secured around its lower edge of the upper edge of sidewall 4 and providing a central filling opening 8 and its upper end through which grain 10 may be poured into the bin. It is generally recommended that the bin be filled only to a point just below conical top wall 6 thereof, as shown, in order to allow a workman to enter the bin through opening 8 to spread the grain evenly over the horizontal area thereof. Opening 8 thus must be wide enough to permit the entry of a man. Said opening is provided with a removable cover 12 to prevent rain from entering the bin.

The insecticide applicator forming the subject matter of the present invention is, in this particular instance, mounted centrally in cover 12. As best shown in FIG. 2, said applicator includes a tubular nipple 16 sealed in and extending through cover 12, a nozzle 18 mounted at the inner end of said nipple, and a pressurized container 20 for insecticide adapted to be interconnected with the outer end of said nipple.

Nipple 16 is disposed normally to the plane of cover 12, extending though a hole 22 formed therefor in said cover. The outer end of said nipple is secure nonrotatably in the base portion 24 of a flange member 26, said flange facing cover 12 with a gasket 28 interposed therebetween, and said nipple is secured in place by a washer 30 and nut 32 threaded thereon at the interior side of said cover.

Container 14 constitutes a metal can or the like for containing an insecticide, and is provided with an externally threaded neck 34 which is hermetically sealed by a normally imperforate but rupturable closure wall 36. If the insecticide is gaseous, it may simply be introduced into the can in compressed form. If the insecticide is liquid, it is introduced into the can together with a propellant gas such as freon, in the manner of the widely used aerosal dispensers used for many different products. It will be understood that containers 14 containing various types of insecticides, and each containing a measured amount of insecticide predetermined to be necessary for a single treatment of a bin of given size, will be made available.

The outer end of nipple 16 has an internally threaded socket 38 formed to present a tubular piercing member 40 projecting axially into said socket. Thus when threaded neck 34 of container 20 is threaded into socket 38, member 40 pierces closure wall 36 as shown, whereby to establish communication between the interior of the container and the base 42 of the nipple. The container neck seats against a gasket 44 in the bottom of the socket 38, to prevent leakage around said neck.

Nozzle 18 consists of a tubular body member 46 threaded on the inner end of nipple 16, and having a bore 48 communicating with bore 42 of the nipple, said body terminating at its lower end in an externally conical formation 50 disposed coaxially with said body member, an a tubular nosepiece 52 threaded on said body member and having a reduced orifice 54 at its lower end. Inwardly of said orifice, said nosepiece is of hollow conical form, as at 56, and seats against the conical formation 50 of the nozzle body, grooves 58, usually of spiral form, being formed in the face of formation 50 to establish communication between orifice 54 and an annular chamber 60 formed between body 46 and the nosepiece at the base of formation 50. Bores 62 formed radially in body 46 establish communication between body bore 48 and chamber 60. Thus insecticide from container 20 passing through nipple 16 passes through bores 48 and 62 of the nozzle body into chamber 60, and hence through grooves 58 and orifice 54 to the interior of bin 2, in the form of a generally conical spray if the insecticide is in liquid form. In general, the total included angle of the spray cone is determined by the included angle of the conical portion 50 of the nozzle body and the mating conical surface 56 of the nozzle nosepiece, and can be varied by proper selection of these angles. Applicants make no claim of invention as to this type of nozzle, that actually shown merely being illustrative of the fact that nozzles provided predetermined spray angles are available.

It will be seen from consideration of FIG. 1 that if nozzle 18 is disposed above the central point of the bed of grain 10 in the bin, and if the spray angle thereof is properly selected with respect to its elevation above said grain bed, then the entire surface of the grain bed will be sprayed evenly and uniformly, as desired for best treatment and for most economical usage of the insecticide. The diameter of the spray cone, at the grain bed, should be equal to the diameter of the grain bed. If the spray cone were narrower, the central portion of the grain bed would be sprayed to an unnecessary or excessive degree, while its edge portions would receive a deficient amount of the spray, or none at all. If the spray angle were wider, some of the spray would impinge on sidewall 6 of the bin, or on conical top wall 4 thereof, depending on the bin shape, and flow down said walls into the grain. Thus the edge portions of the grain bed would receive excessive amounts of insecticide, and the central portion would receive deficient amounts. Of course, if the insecticide is in gaseous form as it emerges from the nozzle, the spray angle of the nozzle is unimportant, and the nozzle could in fact to dispensed with.

It is obviously not necessary that the applicator be mounted in removable bin cover 12 as shown, although this location is convenient in the particular bin shown, especially in providing easy access to all portions of the applicator. It is important only that nozzle 18 be disposed centrally of and above the grain bed, and any convenient portion of the top bin wall could thus be utilized for mounting nipple 16 if cover 12 is not disposed centrally of the bin. In some bins, the filling opening and its cover are disposed at one side of the bin rather than centrally thereof.

The advantages of the applicator shown and described are substantial. No workman need ever enter the bin during or immediately after any application of insecticide, thus eliminating the health hazard attendant to the breathing of insecticide fumes. This advantage is particularly important when the insecticide constitutes the heavier-than-air gases commonly used for weevil treatment, such gases being especially hazardous to humans. Since no workman need enter, cover 12 may be left in place so that no light enters the bin. This, as previously noted, prevents surface insects, commonly combated by liquid insecticides, from burrowing deeper into the grain bed to escape the light, and consequently permits effective treatment with a smaller amount of insecticide, since greater amounts are required to penetrate deeper into the grain bed. Proper selection of the position and spray angle of nozzle 18 insures uniform application and hence maximum effectiveness of a given amount of insecticide, and hence provides further economy of insecticide consumption as compared to hand applying methods. The use of precharged pressurized containers 20, each filled with the precise quantity of insecticide calculated to be required for a single treatment of the bin to which it is to be applied, both insures application of the proper amount of insecticide, adequate but not excessive, and also obviates any need for related, on-the-site power-spraying equipment, such as motors, compressors, and the like. Said container is simply screwed into socket 38 whenever treatment is deemed necessary, with no further operation or human attention being necessary. The container may simply be left in position for indefinite periods after it is exhausted, or until treatment is again required, to act as a seal preventing the entry of rain or the like into nipple 16.

While we have shown and described a specific embodiment of our invention, it will be readily apparent that many minor changes of structure and operation could be made without departing from the spirit of the invention.

What we claim as new and desire to protect by Letters Patent is:

1. An insecticide applicator for use in combination with a grain bin having a bed of grain therein and having a top wall beneath which the surface of said grain bed is disposed, said applicator comprising:

a. a tubular nipple sealed in said top bin wall to provide a passageway between the exterior and interior of said bin, said nipple being provided at its outer end with a socket communicating with the bore thereof,
b. a container for insecticide containing an amount of insecticide adequate for a single treatment of the grain in said bin, and in which said insecticide is pressurized, said container being provided with a discharge neck insertable longitudinally into said socket, said neck having a closure member constituting a rupturable wall,
c. a rigid piercing member fixed to said nipple and projecting axially into said socket whereby to enter said neck and pierce said closure wall whenever said container neck is inserted into said socket,
d. means for releasably retaining said container neck in said socket, and
e. sealing means preventing leakage of insecticide between said neck and said socket.

2. An insecticide applicator as recited in claim 1 wherein said socket is internally threaded and said container neck is externally threaded whereby to provide said releasable retaining means, and wherein said sealing means constitutes a gasket interposed between said container neck and the base of said nipple socket.

* * * * *